United States Patent
Atkinson et al.

(10) Patent No.: US 6,647,472 B2
(45) Date of Patent: Nov. 11, 2003

(54) FAST SUSPEND TO DISK

(75) Inventors: Lee W. Atkinson, Houston, TX (US); Vu T. Nguyen, San Jose, CA (US); Mark W. Peters, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/366,925

(22) Filed: Feb. 14, 2003

(65) Prior Publication Data

US 2003/0131206 A1 Jul. 10, 2003

Related U.S. Application Data

(62) Division of application No. 09/751,165, filed on Dec. 29, 2000, now Pat. No. 6,546,472.

(51) Int. Cl.[7] .............................................. G06F 12/16
(52) U.S. Cl. ...................................... 711/158; 711/162
(58) Field of Search ................................. 711/158, 161, 711/162; 713/320

(56) References Cited

U.S. PATENT DOCUMENTS

2002/0073358 A1   6/2002   Atkinson ..................... 714/21

Primary Examiner—Jack A. Lane

(57) ABSTRACT

A computer system supports a fast hibernation operation to save power, while minimizing the amount of time it takes to enter the hibernation mode, and to resume normal operations. The system periodically stores data from system memory to non-volatile memory, such as a hard disk drive, during normal operations when the system is idle. The system includes activity monitors that detect when the data in memory pages is changed. The system periodically sweeps the monitors, and performs save operations to the non-volatile memory. When the system enters hibernation mode, the system determines which memory pages have been changed since the last save operation, and then saves those pages to memory. As an alternative, the system immediately can enter hibernation by supplying power to the memory pages that have not been saved since the last save operation. To implement this, independent switches under the control of the CPU of memory controller selectively turn off power to unsaved memory pages. The system can also implement a fast resume procedure by restoring the memory pages that have the highest priority, and saving the other pages in the background, or as need by the system devices. Prior to entering the hibernation mode, the pages may be prioritized based on various factors, including the last pages used, the pages used most frequently, or the pages that store the most critical data.

9 Claims, 4 Drawing Sheets

FAST SUSPEND TO DISK

CROSS-REFERENCE TO RELATED APPLICATIONS

This application is a divisional of U.S. patent application Ser. No. 09/751,165, filed Dec. 29, 2000, now U.S. Pat. No. 6,546,472 and is incorporated by reference herein.

STATEMENT REGARDING FEDERALLY SPONSORED RESEARCH OR DEVELOPMENT

Not applicable.

BACKGROUND OF THE INVENTION

1. Field of the Invention

The present invention generally relates to data storage in computer systems. More particularly, the present invention relates to the manipulation of data that has been stored in random access memory during periods when the computer system is placed in a low power mode to minimize the latency that otherwise occurs when the system enters a low power mode and resumes operation from a low power mode.

2. Background of the Invention

Almost all computer systems include a processor and a system memory. The system memory functions as the working memory of the computer system, where data is stored that has been or will be used by the processor and other system components. The system memory typically includes banks of dynamic random access memory (DRAM) circuits. According to normal convention, a memory controller interfaces the processor to a memory bus that connects to the DRAM circuits. The system memory provides storage for a large number of instructions and/or a large amount of data for use by the processor, providing faster access to the instructions and/or data than would otherwise be achieved if the processor were forced to retrieve data from a disk or drive.

Because system memory typically is constructed of dynamic random access memory circuits, the contents of the memory are volatile. To preserve the integrity of the data stored in system memory, a periodic refresh signal must be sent to each memory cell to refresh the voltage levels of each cell, where the data is stored. Failure to timely refresh the memory cells of system memory causes the data to be lost. Thus, when power is turned off to a volatile memory device, the contents of that memory are lost. Data that is to be stored long-term on a computer system thus is stored in other non-volatile memory devices. Most computer systems include a hard drive that is capable of permanently storing data on magnetic tape. Other removable drives, such as zip drives, CD-ROMs, DVD-ROMs, and the like, may also be used for long-term storage of data. In these types of media, the data is preserved, even when power is removed from the computer system.

Almost all portable computers, and some desktop computers, may be placed in a low power state to preserve power. Preservation of power is especially important in portable computers, where operating power may be provided from batteries. To extend the life of batteries in portable computers, and thus extend the amount of time that a user can operate a portable computer without recharging the batteries or finding an electrical source, most portable computers are capable of going into a sleep mode where minimal power is consumed. The sleep mode permits the computer system to be placed in standby, so that operation can resume when the user is ready, without requiring the system to boot.

As power management of portable computer systems has evolved, two different low power modes have been developed and used commercially. The first low power state is referred to as the "suspend" mode or "Suspend to RAM" mode. In the suspend mode, the system memory remains powered while the system is taken to a non-operational state. The advantage of keeping the system memory powered is that when operation is resumed, the system is ready within a very short period for operation, in the state last used by the operator. Thus, resuming from a suspend mode only takes a few seconds, because very little system context is moved. Suspend to RAM generally is preferred as a bookmark feature because of its "instant on" low latency resume time. Suspend to RAM is also called the S1, S2, or S3 power state by the ACPI nomenclature.

Conventional Suspend to RAM works by stopping the clocks to the system, while leaving the entire system power on. Because the power used by the system depends on the system clock speeds, removing the clock signals significantly lowers the system power. Suspend to RAM often is referred to as "Power on Suspend." When the system resumes operation from Suspend to RAM, the clocks may simply be started to restore system operation. Another form of Suspend to RAM stores the context of certain system devices to system memory. Examples of the device contexts that may be saved include peripherals such as audio controllers, the state of the processor, the contents of the processor cache, and the like. Once the context of these devices is stored to system memory, the clocks to those devices are stopped and power is removed. The system memory, however, remains powered to maintain its contents. To resume operation, the system BIOS or operating system restores the context of the peripherals from system memory, and then system operation is resumed.

The second low power mode is known as "hibernation" or "hibernation to disk", which is referred to as the S4 power state by the ACPI nomenclature. In this mode, which is the lowest power mode of the computer system other than power-off, the computer system consumes minimal energy. The hibernation mode can be analogized to a no-power bookmark of the existing state of the computer system. When the hibernation mode is entered, the system hardware state is copied to the hard drive in a predetermined sequence. Because the hard drive is non-volatile memory, all power can then be removed from the system. Upon resume, the system is powered on, and control is given to the system ROM. A sequence called POST performs initial configuration of the system. During the POST sequence, the BIOS checks a bit in non-volatile memory to detect if the system had been placed in the hibernation state the last time system power was turned off. If the BIOS determines that it is resuming from a hibernation state, it will start to restore the system in a predetermined way. First, the system peripherals may be configured by reading the data from the hard drive. After system peripherals are configured, the system memory may be restored to the state that existed just prior to placing the system in hibernation. The BIOS algorithm will restore the system DRAM, filling DRAM memory in a predetermined sequence. After the entire state of the system has been restored by the ROM-based restoration algorithm, control of the system is handed to the operating system and the system user. Hibernation to disk thus allows the user to set a bookmark so that they can leave the system in a very low or no power state, and then return to the exact environment where they turned off the computer system. Because the context of the system is stored in non-volatile memory (on the hard drive), it provides reliable storage of the data in system memory, even during the low power state.

A delay period is encountered as the system context is stored to the hard drive, and again when the context is reloaded from the hard drive back to the system memory. The time required to access data from the hard drive is significantly longer than accessing data from system memory. Thus, there is a perceptible delay that occurs when data is loaded from the hard drive to the system after the hibernation mode is exited. This delay is exacerbated by increasingly large system memories. In many instances the suspend or resume process can require more than one minute to execute. This delay period is unworkable for systems that must be capable of instantly turning on to handle events.

Some have suggested that the data in system memory be compressed before hibernation occurs, to reduce the amount of data that must be copied and retrieved. Unfortunately, compression algorithms require extensive CPU power, and thus the act of compressing the system memory may actually require more time than simply writing uncompressed data to the hard drive. The Windows 2000 Operating System uses the knowledge of memory usage, so that unused areas of memory are not saved to disk during a hibernation event, as compared to previous systems, which typically stored the entire state of the memory, regardless of whether it contained valid data or context. Thus, this technique may reduce latency in suspend and resume operations, but only if the system memory has not been used substantially.

Conventional Hibernation to Disk is implemented by powering down the system in response to a system event. The system event can be the manual selection of an icon or menu entry, the selection of one or more keys, or system inactivity. Because the hibernation mode results in the removal of power, the context of all system peripherals is read and then stored to the hard drive. Next, the contents of the system memory are copied to the hard drive. A hard drive file that is equal to the size of the memory to be stored is created, which holds a mirror image of the system memory. After the contents of system memory are backed up, a flag is set in non-volatile memory indicating that the system context has been completely saved. Once the flag is set, the power is removed causing the contents of volatile memory (such as DRAM and the context of peripheral devices) to be lost. When the system resumes operation, the system BIOS or operating system polls the non-volatile flag bit that indicates that the hard drive contains valid system context. If the flag bit is set, the BIOS or operating system restores the system context from the hard drive before resuming system operation.

While the BIOS restoration algorithm is cognizant of the amount of system memory in the system, it has no knowledge of how extensively the operating system uses system memory. Thus, it is possible that the operating system has made very little or no use of system memory. For example, if the prior boot used a small, simple application, less than 10 MB of memory context may have been used. The BIOS restoration algorithm would, nonetheless, save and restore the entire amount of memory installed is the computer system was placed in a hibernation mode.

In addition, the time for a traditional store to disk does not start until the hibernation sequence is initiated. The operating system could have been idle for hours before the sequence was initiated, but because the sequence is performed automatically, the time needed for hibernation may be lengthy. In the case of a hibernation to disk initiated from a critical low battery condition, the inaccuracy of the fuel gauge may mean the system will exhaust its power before the hibernation sequence is finished (causing lost work or data). Thus, currently, the hibernation algorithm does not take proactive steps prior to the actual initiation of the hibernation sequence that could minimize the amount of time to conduct the hibernation to disk. In addition, the hibernation algorithm does not prioritize the data being saved.

For resume from hibernation, the length of time from when the system is turned on until it is usable is determined by the amount of memory stored. The resume sequence may force the user to wait while invalid or low priority data is restored to system memory. Thus, the restoration algorithm does not prioritize the data being restored to system memory.

It would be advantageous if memory that is not used is not stored or restored by the hibernation sequence. It also would be advantageous if the time required to hibernate the system to disk is reduced by keeping an image of the system context mirrored on the hard drive. Additionally, it would be desirable if the system could selectively decide that some of the system memory may not be hibernated, and should remain powered during a hibernation. Further, it would be advantageous if the time to restore the system to a usable state is shortened by restoring the system memory in an intelligent order.

Despite the deficiencies of the current hibernation and restoration algorithms, to date no one has developed a hibernation and restoration sequence that overcomes these problems.

BRIEF SUMMARY OF THE INVENTION

The present invention solves the deficiencies of the prior art by configuring a computer system to support a fast hibernation mode of operation that saves power, while also minimizing the amount of time it takes to enter the hibernation mode, and to resume normal operations. The system periodically stores data from system memory to non-volatile memory, such as a hard disk drive, during normal operations when the system is idle. The system includes hardware activity monitors in the memory controller, CPU, or some other device that detect when the data in memory pages is changed. According to the preferred embodiment, a monitor is provided for each page, although other variations are possible. The monitor includes a number of dedicated bits or flags, including a dirty bit that indicates when the memory page has been the target of a write transaction. The fast hibernation algorithm periodically sweeps the activity monitors, and performs save operations to the non-volatile memory if the dirty bit has been set, indicating that the data has been altered. When the system enters hibernation mode, the algorithm determines which memory pages have been changed since the last save operation, and then saves those pages to memory. When resuming from the instantaneous hibernation mode, the algorithm checks the status of status bits in a control register that indicates which pages have been saved to disk, and restores those pages.

According to another embodiment of the present invention, the system is configured to support an instantaneous hibernation mode of operation. The system periodically stores data from system memory to non-volatile memory, such as a hard disk drive, during normal operations when the system is idle. The system includes hardware activity monitors in the memory controller, CPU or some other device that detect when the data in memory pages is changed. According to the preferred embodiment, a monitor is provided for each page, although other variations are possible. The monitor includes a number of dedicated bits or flags, including a dirty bit that indicates when the memory page has been the target of a write transaction. The fast hibernation algorithm periodically sweeps the activity monitors, and performs save operations to the non-volatile memory if the dirty bit has been set, indicating that the data has been altered. When the system enters an instantaneous hibernation mode, the algorithm checks the dirty bits and selectively supplies power to the memory pages that have not been saved since the last save operation. To implement this, independent switches under the control of the CPU of memory controller selectively turn off power to unsaved memory pages. When resuming from the instantaneous hibernation mode, the algorithm checks the status of status bits in a control register that indicates which pages have been saved to disk, and restores those pages.

According to another embodiment of the present invention, the system can also implement a fast resume procedure by restoring the memory pages that have the highest priority, and saving the other pages in the background, or as needed by the system devices. Prior to entering the hibernation mode, the pages may be prioritized based on various factors, including the last pages used, the pages used most frequently, or the pages that store the most critical data. The priority data may be saved to the control register or to any other suitable register. When power is resumed, the algorithm checks the priority data, and immediately restores the page or pages with the highest priority from the non-volatile memory. Other pages are subsequently restored in the background of other operations during idle time, or when data in unrestored pages is accessed.

These and other aspects of the present invention will become apparent upon analyzing the drawings, detailed description and claims, which follow.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection or through an indirect electrical connection via other devices and connections. The term "system memory" refers to the working memory of a computer system. The term "DRAM" is intended to refer to system memory that is implemented with dynamic random access memory components. To the extent that any term is not specially defined in this specification, the intent is that the term is to be given its plain and ordinary meaning.

DETAILED DESCRIPTION OF THE PREFERRED EMBODIMENTS

The present invention covers certain aspects of entering and exiting a low power state. There are three general aspects of a low power state described in the following detailed description: (a) performing a fast hibernation to minimize the amount of time it takes to hibernate data from the system memory to disk; (b) performing an instantaneous hibernation or hybrid suspend to disk operation; and (c) performing a fast resume from a suspend state. Each of these three aspects may be practiced independently of each other, or may be used in combination, as desired by the system designer or user.

A. Fast Hibernation

Figure 1:
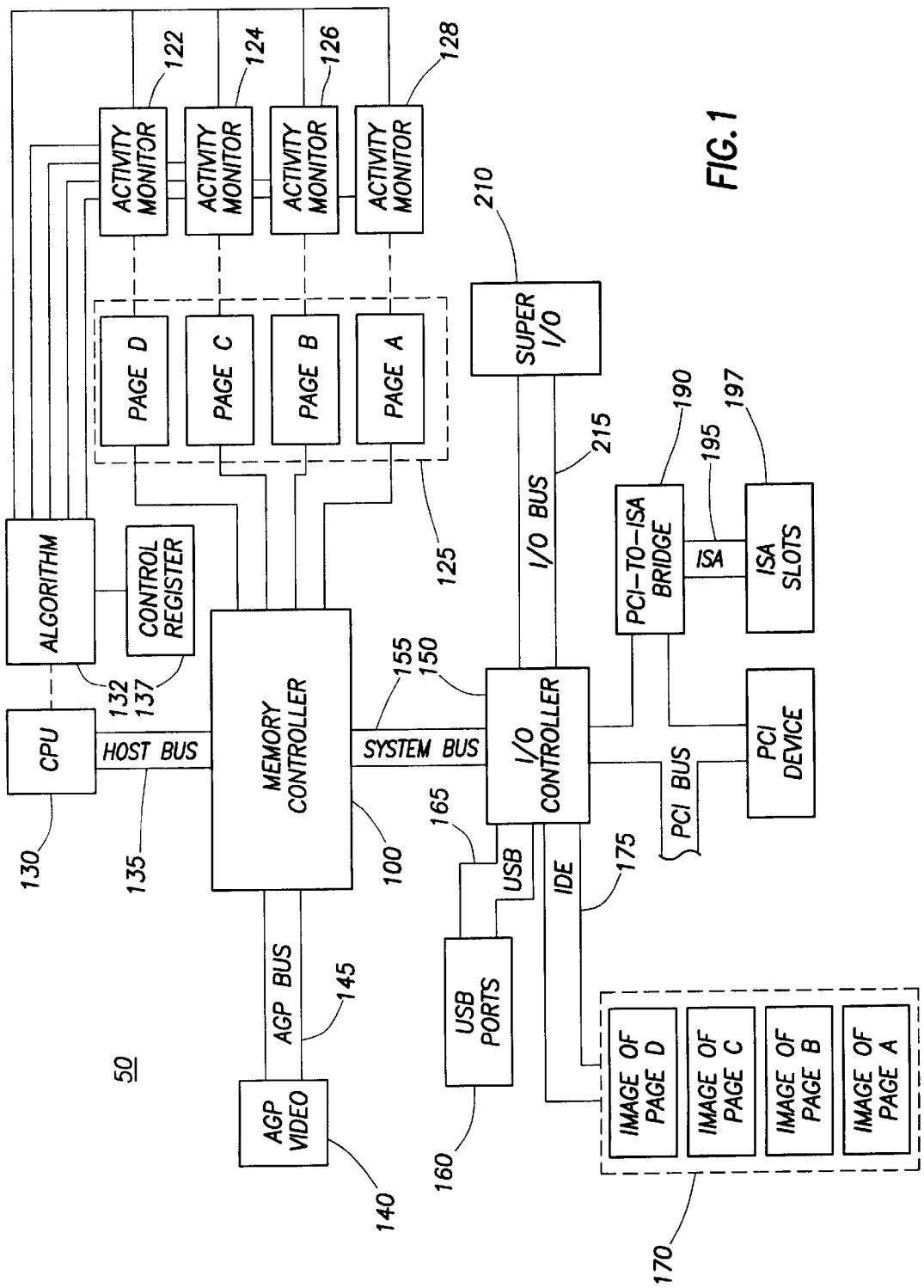
FIG. 1 is a block diagram illustrating an exemplary computer system constructed according to the preferred embodiment.

Referring initially to FIG. 1, a computer system 50 may comprise a personal computer, a web computer, a server, or a workstation, without limitation. Although not shown, the computer system 50 preferably couples via a suitable network connection to a local area network (LAN). As shown in FIG. 1, the computer system 50 preferably implements a standard computer architecture, including a CPU (or processor) 130, system memory 125, a memory controller 100, AGP video controller 140, and I/O controller 150. The processor 130 preferably couples to the memory controller 100 through host bus 135. It should be understood that other embodiments of the invention may include more than one processor or CPU coupled to the host bus. The processor may comprise any suitable microprocessor such as the Pentium II®, Pentium III®, or Celeron® processor by Intel®, the Athlon® processor by AMD, the Alpha processor by Compaq, or other microprocessors from these or other manufacturers that may be used or configured for use in a computer system.

In accordance with normal convention, the CPU 130 executes programs and algorithms to control operation of the computer system. One such algorithm 132 is shown in FIG. 1. Although algorithm 132 is depicted separately from the CPU 130, it should be understood that the algorithm runs on the CPU 130, or some other device capable of executing algorithms. The algorithm 132 preferably controls the hibernation of data from the system memory 125 to non-volatile memory, as will be discussed in more detail below.

The system memory 125 preferably comprises one or more memory devices such as any suitable type of random access memory (RAM). System memory may comprise, for example, synchronous dynamic random access memory (SDRAM), or other memory designs suitable for use in a computer, including double data rate dynamic random access memory (DDR DRAM) or Rambus Direct Random Access Memory (RDRAM). According to the preferred embodiment, the system memory 125 comprises multiple dynamic random access memory devices that are volatile in nature. Thus, when power is removed from the system memory, the memory cells lose the data stored therein. Preferably, the system memory 125 is partitioned into memory pages of any arbitrary size. Partitioning the system memory into smaller pages enables the algorithm 132 to selectively store and restore selected pages of memory, thus providing greater flexibility in the hibernation and restoration process. The separation of the system memory into pages can be done on a physical basis, or on a logical basis. As shown in FIG. 1, the system memory 125 is partitioned into four pages of memory, indicated as Page A,-Page B, Page C and Page D for purposes of illustration. If the system memory comprised 128 MB of DRAM, this would translate into pages of 32 MB each. As noted above, this partitioning is arbitrary, and more or less pages may be used. Pages as small as a few KB may be used if desired.

The memory controller 100 permits the processor 130 and other master devices in the computer system 50 to read data from or write data to system memory 125. Thus, the memory controller formats data cycles from other components in the computer system 50 in a manner that is compatible with the memory devices used in the system memory 125. The memory controller 100 performs necessary precharge charge, refresh, and other cycles as required by the memory devices. In addition, the memory controller issues appropriate commands such as row address strobe commands and column address strobe commands as necessary to access the memory. These commands typically include a write enable (WE) command that indicates if the access is a read cycle or a write cycle.

The memory controller 100 may link to each DRAM device by a common memory bus, or may connect to banks of memory devices by separate memory bus channels. According to the preferred embodiment, the memory is partitioned into pages. Four such pages are shown in FIG. 1 for purposes of illustration, with the understanding that many more page partitions may be provided if desired. The present invention permits each memory partition to be handled separately for hibernation and restoration, and thus the greater the number of pages, the more flexibility provided.

According to the preferred embodiment, an activity monitor couples to each page of system memory. Thus, as shown in FIG. 1, activity monitor 122 couples to Page D of memory 125; activity monitor 124 couples to Page C; activity monitor 126 couples to Page B; and activity monitor 128 couples to Page A. The activity monitors 122, 124, 126, 128 preferably are implemented in hardware, but may be implemented in software if desired. The activity monitors may reside in the memory controller 100, and operate by monitoring the status of certain control or data lines in the memory bus coupled to the appropriate memory page. Alternatively, the activity monitors 122, 124, 126, 128 may reside inside the CPU and decode the internal address pointer in the CPU.

Figure 2:
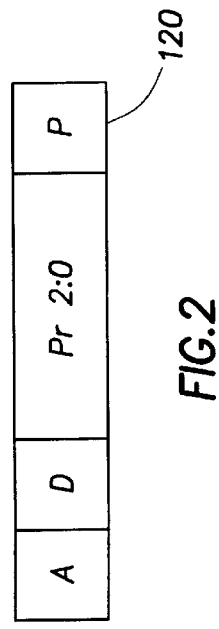
FIG. 2 is a diagram of the hardware activity monitor of FIG. 1, constructed in accordance with the preferred embodiment.

As shown in FIG. 2, each activity monitor 122, 124, 126, 128 preferably includes a register that has certain designated bits for indicating activity to the associated page of memory. According to the preferred embodiment, the activity register 120 includes one or more of the following bit fields:
  an accessed bit (bit A) that is set when the memory page receives a read or write request;
  a dirty bit (bit D) that is set when the memory page is written to;
  priority data bits (bits Pr 2:0) that are used by the algorithm to indicate the amount of activity to the associated page of memory. Preferably there are at least three priority data bits;
  a present bit (bit P) that indicates that the physical page of system memory is being used and holds valid data.
The fields identified above may have multiple bits designated to function as a counter. Thus, the accessed and dirty bit fields may have multiple bits to act as a counter that increments proportionately to the read or write activity to the associated page of memory. Activity detected by the activity monitors may cause an interrupt to be generated to the CPU 130, to which the algorithm 132 responds. As an example, an access to a memory page will cause an interrupt to be generated if the present bit is cleared and a read or write access is attempted to that page.

According to the preferred embodiment, all activity register status bits are readable and clearable from the algorithm 132 in response to a particular timing event. The memory pages may correspond to particular memory ranges. In accordance with the preferred embodiment, pages are organized by a combination of Page Directories and Page Tables. The size of each page preferably is controlled by the Operating System. Page Directories and Page Tables both include accessed bits, and any read or write cycle to a page of memory in the page table/page directory will set the accessed bit. Page tables also have a dirty bit that indicates if the memory range has received a write transaction. In the event a memory access is made to a page where the present bit is cleared, a high level interrupt (known as a page fault interrupt) is generated and transmitted to the CPU. The instruction pointer is captured, so that service of the interrupt will precede the access to the memory range where access was attempted. Most CPU's will not support paging for other bus master devices that may access memory without the involvement of the CPU. Typically, the operating system will allocate specific memory ranges that bus masters are allowed to access so that the CPU memory activity monitors are not required.

According to normal convention, the hibernation algorithms reserve a single, logically contiguous partition on the hard drive for saving the system context. Instead, the hard drive preferably contains hard drive page mirrors of the system memory organization. Thus, FIG. 1 shows a hard drive 170 that includes a mirrored image of each of the pages of memory. When hibernation is complete, the reserved hard drive sections will hold a copy of the system memory pages.

Figure 3:
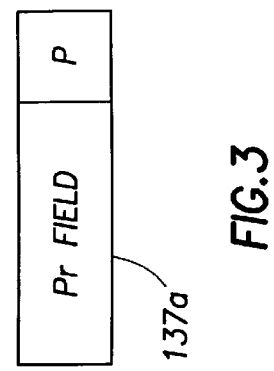
FIG. 3 is a diagram of the control register of FIG. 1, constructed in accordance with the preferred embodiment.

Referring still to FIG. 1, a control register 137 preferably comprises random access memory that is used by the algorithm 132 during the resume process. The control register 137 may alternatively comprise non-volatile memory that is located on the hard drive 170, which includes one or more of the fields shown in the exemplary control register 137a of FIG. 3:
  a priority field that corresponds to the priority data bits, Pr, for each page of memory;
  a presence bit (bit P) for each page of memory;
Preferably the control register 137 includes a plurality of registers, with one register associated with each page of memory. Thus, register 137a in FIG. 3 may comprise, for example, the control register associated with Page A of system memory 125.

As shown in FIG. 1, the memory controller 100 also preferably includes an interface to an advanced graphics port (AGP) to support a graphics video controller 140 or other graphics device. According to normal convention, an AGP bus 145 couples the video controller 140 to the memory controller 100. As one skilled in the art will understand, graphics processors or accelerators implementing other protocols also may be used instead of an AGP controller. Typically, a monitor (not shown) couples to the video controller 140. The memory controller 100 also preferably functions as an interface to a system or peripheral bus 155. In the preferred embodiment, the system bus 155 comprises a high-speed data bus to the I/O controller hub 150.

The I/O controller hub 150 bridges the system bus 155 to a variety of peripheral busses, including a USB bus 165, an IDE bus 175, and a PCI bus 185. Coupled to each of these busses are ports or slots that enable compatible devices to be connected to the computer system 50. Thus, for example, a PCI peripheral device, such as a PCI-compatible network interface card (or NIC) may be inserted into one of the PCI slots 180, for coupling to the I/O controller 150 via the PCI bus 185. In similar fashion, USB devices may be connected to the computer system through one or more USB ports 160, and IDE devices may be connected to the system by inserting the IDE device in any available IDE slot. In accordance with the preferred embodiment, one or more hard drive devices 170 may be connected to the IDE bus 175, as shown in FIG. 1.

To support legacy ISA devices, a PCI-to-ISA bridge 190 preferably couples to the PCI bus 185. A conventional ISA bus 195 couples ISA slots 197 to the PCI-to-ISA bridge 190. Other devices, such as a modem, audio amplifier, or LAN connection may connect directly to the I/O controller hub 150, or may couple via the conventional peripheral busses.

As shown in FIG. 1, the I/O controller hub. 150 preferably couples to a Super I/O controller 210 through an I/O bus 215. The Super I/O device 210 preferably includes conventional ports for coupling to floppy disk drives, a keyboard, and a mouse. Thus, the Super I/O device 210 preferably includes conventional keyboard and mouse controllers for converting user inputs to a traditional format for relaying to the CPU 130. The Super I/O 210 also preferably includes standard parallel and serial ports to permit other peripheral devices to be added to the computer system 50, as desired by the user.

It should be understood that although a preferred architecture is shown for a computer system, that various other architectures are possible. Thus, for example, conventional North bridge and South bridge topology may be used, if desired. The system architecture of the system is not critical, and thus the invention should not be construed as limited to a particular architecture.

The present invention may be used in any computer system that includes a volatile memory and a non-volatile memory, and which may be placed in a low power mode. The present invention preferably comprises a portable computer system, or other computer system that supports a low power mode of operation. Preferably, the low power mode comprises a Fast Hibernation to Disk mode that operates by making a back-up copy of the system memory 125 to the non-volatile hard drive 170 prior to entering the hibernation mode. As will be apparent to one skilled in the art, other non-volatile memory devices may be used instead of the hard drive. Examples include CR-ROMs, DVD-ROMs, zip drives, tape drives, and the like. When the system is ready to resume operation, the system restores the contents of the system memory 125 from the hard drive 170.

In accordance with the preferred embodiment, Fast Hibernation to Disk takes advantage of idle times while the computer system is in its normal active working state. During these idle times when the CPU 130 is idle or has excess capacity (or bandwidth), the algorithm 132 periodically saves pages of memory to the hard drive 170 so that some pages of memory will already be stored to the hard drive before the hibernation or suspend mode is initiated. When the hibernation sequence is ultimately requested, the additional work required to finish the Suspend to Disk or Hibernation operation is thereby shortened. Operation according to the preferred embodiment will now be described in greater detail.

Figure 4:
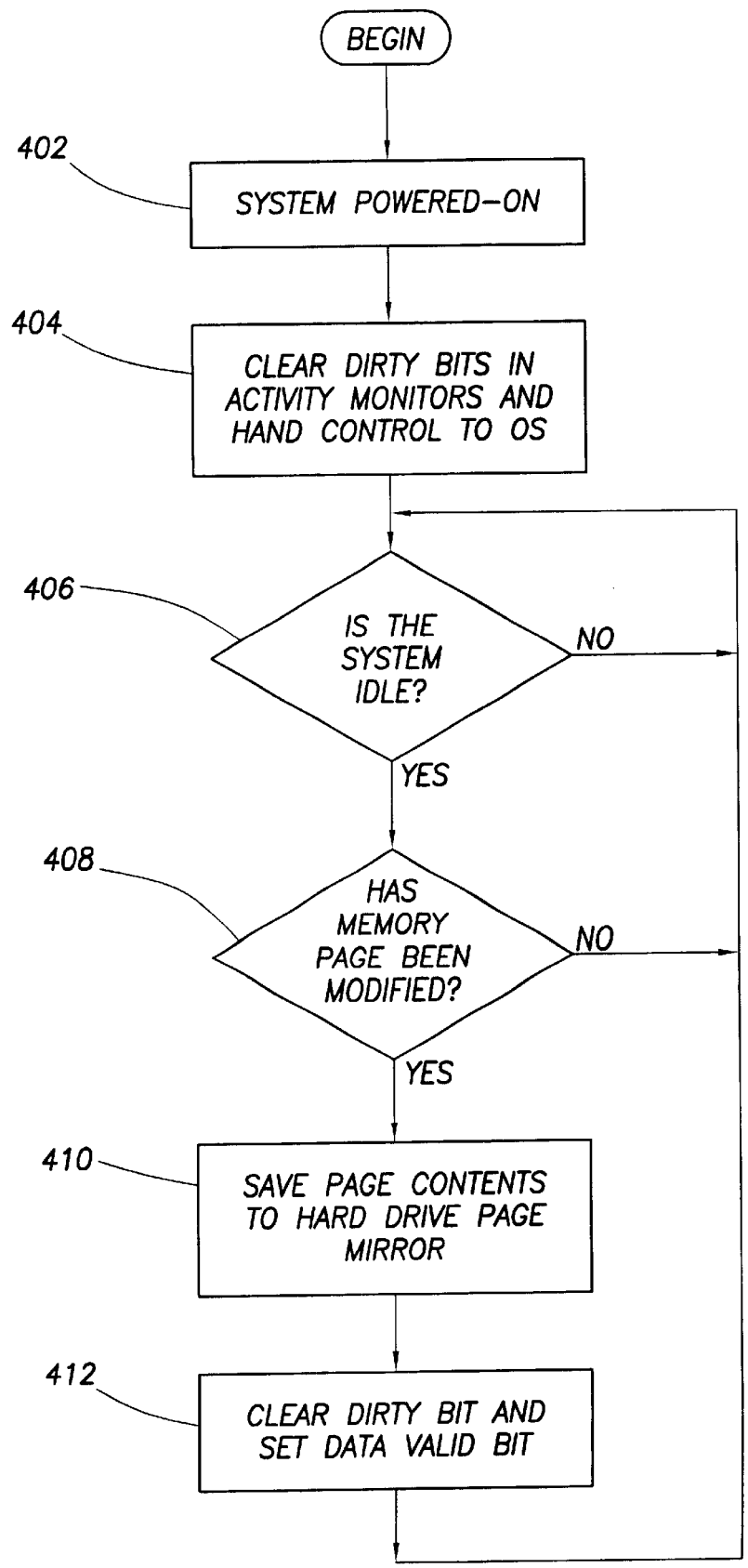

Referring now to FIGS. 1, 2 and 4, when the computer system is first powered-on (step 402) from either being off (the S5 state) or being in a hibernated state (the S4 state), the algorithm 132 clears the dirty bits (bit D) in the activity monitors 122, 124, 126, 128, and then hands control to the Operating System, as shown in step 404. Periodically, while in the normal operational state, the algorithm 132 is initiated and checks to determine if the system is idle or operating with excess capacity (step 406). According to the preferred embodiment, the algorithm 132 is initiated by an inactivity timeout of the computer system, such as a timeout of the hard drive and/or detection of CPU idle time. Methods to detect hard drive and system inactivity are well known. Operating in this fashion permits the algorithm to operate in a background mode, without disturbing other system operations. Alternatively, the algorithm may be initiated periodically from an appropriate clock source. As yet another alternative, the algorithm may be initiated after a certain number of CPU idle calls.

Regardless of how the system is called in step 406, the algorithm checks to determine if any page of memory has been modified in step 408. According to the preferred embodiment, the algorithm determines that a memory page has been altered by examining the dirty bits (bit 0) for each activity monitor register. If none of the dirty bits have been set, then the algorithm returns to step 406 until being again initiated in response to a determination that the system again is in an idle state. If one or more memory pages have been modified, then the algorithm in step 410 saves the page contents of any page that has been modified to the associated image section reserved on the hard drive. While the save operation is executing, the algorithm clears the dirty bit in the activity monitor associated with that page, and sets the present bit in the control register associated with that data page (step 412). Thus, another write to the same memory page will result in the dirty bit being set again so the algorithm will determine that the memory page has been modified. The present bit in the control register indicates that the hard drive image has relevant data. At that point, the algorithm returns to step 406 where it waits to again be called. As an alternative, the algorithm may store the base configuration of the system after the operating system has loaded, but before application programs have gained access.

Figure 5:
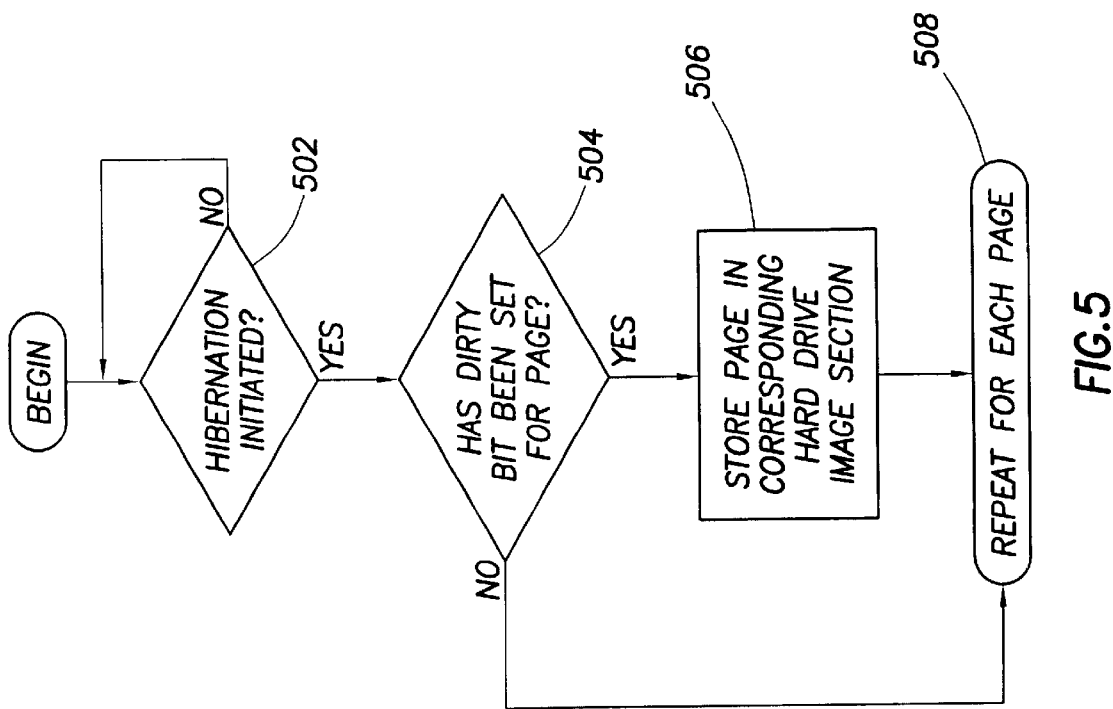
FIGS. 4 and 5 are flow diagrams illustrating a fast hibernation to disk in accordance with the preferred embodiment.

Referring now to FIG. 5, when hibernation is initiated by a system event or manually by a user (step 502), the algorithm only needs to store pages that have not already been stored, or which have been modified since the last store operation according to the flow logic of FIG. 4. Thus, in step 504 the algorithm checks each of the activity monitors 122, 124, 126, 128 (FIG. 1) for dirty bits associated with each page of memory. If any dirty bits are discovered in the active monitors, the algorithm stores the pages of memory to the hard drive that have dirty bits in the associated activity monitor (step 506). This process is repeated for each page until all pages have been checked.

While the flow logic of FIGS. 4 and 5 are shown separately, it should be understood that the flow logic of these two figures may be merged into a single flow logic or algorithm. Also, it should be understood that the flow logic of FIGS. 4 and 5 may proceed on a page-by-page basis, or may be conducted completely for all pages at each step. It should also be understood that the flow logic may be implemented on software, or an algorithm executing on the CPU, or on any other programmable device in the system. The system may also be implemented in hardware, if so desired. The techniques disclosed in FIGS. 1–5 serves to minimize the amount of data that must be transported to the hard drive during a hibernation operation, so that hibernation can occur more quickly.

The preferred embodiment described above may be modified in several respects, as will be apparent to one skilled in the art. One issue that may arise is that the background technique may result in the memory page being stored many times between the initial boot of the system and the time when the system enters a hibernation state. To minimize inefficiencies, the background save feature could be modified when the computer system is using DC (battery) power. The frequency of the saves may be decreased if DC power is being used, and the batteries are substantially charged. As the battery charge becomes lower, the frequency of the background save may be increased.

As another alternative, the priority data field (Pr) of the activity monitor may comprise a counter that detects the amount of write activity to the associated page of memory. The algorithm periodically examines the activity monitor for a memory page to determine how high write activity is to the page. If the amount of activity exceeds a threshold value, then the page is considered active, and the algorithm does not copy the page to the hard drive mirror page, or clear the write bit. If the write activity to that page subsides, it may subsequently be copied to the hard drive. Thus, the algorithm does not waste cycles by saving a page of memory that is likely to be subsequently modified.

A technique for implementing this approach will now be described. Initially, the algorithm clears the priority data field for each activity monitor register. When the algorithm is subsequently initiated, it reads all the page activity monitors. If both the access bit and the dirty bits are set, the algorithm clears the access bit, but does not modify the priority data bits or the dirty bit. If the access bit has not been set, indicating that no access has been made to that page of memory since the last time the algorithm executed, then the priority data bits are indexed, but the dirty bit would not be modified. On each subsequent reading of the activity monitor, the algorithm polls the monitors to again check for activity. If the data priority bits have not changed, and no access has been made, but the dirty bit is set, the algorithm will save that page to the hard drive mirror image because these settings in the activity monitor indicate that the page is not active, but includes modified data that needs to be saved. If, conversely, the data priority bits are changing, and the access bit repeatedly is set, then the data will not be saved until activity subsides. Once the data is saved, the dirty bit is cleared, as indicated in step 412 of FIG. 4.

B. Instantaneous Suspend or Hybrid Suspend to Disk

In some instances it may be desirable or necessary to perform an instantaneous hibernation, or a hybrid Suspend to RAM. A Suspend to RAM freezes the system context in system memory, not on the hard drive as in Hibernate to Disk. Suspend to RAM has the advantage of a very low latency for suspend and resume operations because the data remains in the system memory. The disadvantage of a Suspend to RAM is that the system memory must remain powered to refresh the memory cells to prevent data loss. Using the techniques described above for a Fast Hibernation, it is possible to perform an instantaneous hibernation or a Hybrid Suspend to RAM, in which portions of the system memory are transported to the hard drive during normal operation by the algorithm executing in the background, and other portions are saved on specific pages of system memory that remain powered when the computer system enters the suspended state.

Figure 6:
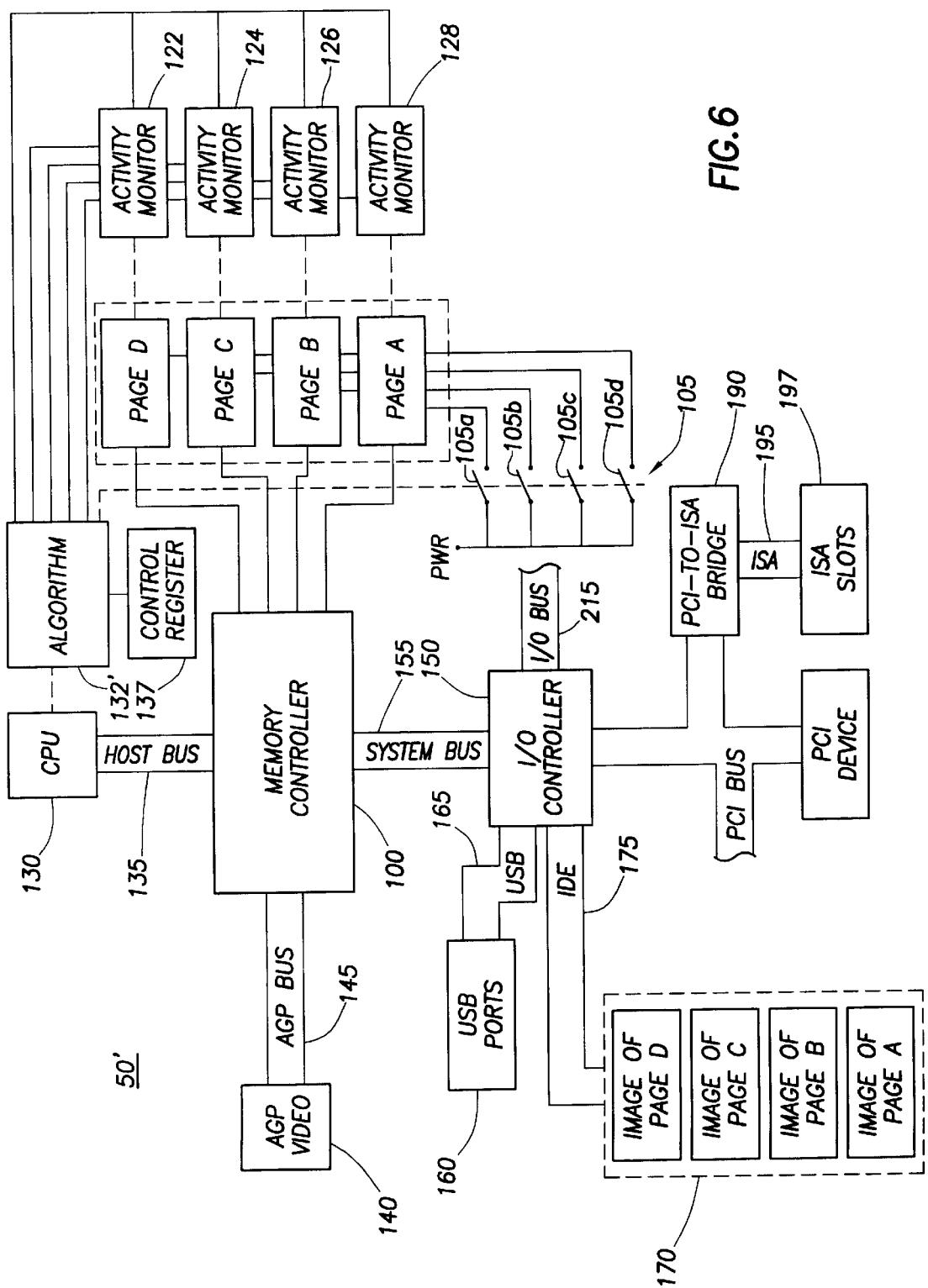
FIG. 6 is a block diagram of a computer system capable of performing an instantaneous hibernation, according to an exemplary embodiment of the present invention.

Referring now to FIG. 6, a set of power switches preferably are added to the system architecture of FIG. 1 to implement the instantaneous hibernation technique. The other portions of FIG. 6 use identical numbers as used in FIG. 1 to indicate identical components. These components will not be described again for the sake of brevity.

The computer system 50' of FIG. 6 preferably includes power switches 105 that operate under control of the algorithm 132'. Typically, all pages of system memory have a common power connection. According to the embodiment illustrated and described herein, each page of memory has a separate power switch. Thus, as shown in the example of FIG. 6 where four pages of memory are defined, there are four power switches 105a, 105b, 105c, 105d, each of which is associated with a particular page of memory, so that power switch 105a switches power on and off to Page A, power switch 105b switches power to Page B, and so on. The result of this configuration is that each physical page of memory can be individually powered. Thus, preferably the power terminal (pwr) remains powered even when the system is in a suspend or hibernation mode.

According to the embodiment illustrated in FIG. 6, periodic saves to the non-volatile memory preferably occur in the background, as described generally above with reference to FIGS. 1–4. When Suspend or Hibernation is initiated, the algorithm 132' determines which physical ranges of system memory are invalid, and which pages of memory have already been stored to the hard drive image, as indicated by the activity monitors 122, 124, 126, 128, and control register 137. The algorithm then powers off these pages by selectively opening the power switches 105 associated with these memory pages. With respect to the pages of memory that contain valid data, and which have not yet been saved the hard drive image, the algorithm keeps power to those pages to maintain the data stored in those memory pages while the system is in the suspend mode. When the system resumes normal operation, the algorithm determines which pages remained powered during suspend, and which were not. This information can be indicated by appropriate status bits in the control register 137 or other saved context information, or by examining the state of the power switches when resuming from the suspend mode. The algorithm then restores data to the other pages of system memory whose contents were copied to the hard drive image, as indicated by the control registers associated with each of the pages.

As a variation to the above technique, the algorithm may selectively copy some of the pages to the hard drive image to minimize the power that would be consumed if all of the pages were powered. As an example, in a system with 1024 pages with only 24 having been previously saved, the algorithm may decide to save a certain number or percentage of pages to minimize the pages that must remain powered while the system is in the suspend state.

C. Fast Resume From Hibernation

Traditional resume from Hibernation uses a predetermined addressing sequence to restore the contents of system memory from the hard drive. Control is passed to the operating system software after the entire resume sequence has been completed. In contrast, the method for implementing a Fast Resume decreases the amount of time required for the system to assume a working state. According to the preferred embodiment, this is achieved by sequencing or delaying the restoration of system memory so that the system application is allowed to assume control before the entire system state has been restored from the hard drive image. In some instances, certain portions of the system state may not be used before the next suspend state is entered. The present invention may indefinitely delay the restoration of system memory from the hard drive, thereby reducing the power consumed for restoration, as well as saving the time that would otherwise be lost in a Suspend/Resume/Suspend cycle. The Fast Resume technique prioritizes the pages of system memory that are most likely to be used after the system resumes normal operation. The Resume process thus restores system memory pages based on a priority basis. In particular, pages of memory are given priority that are required to run open applications, while pages associated with inactive applications are given a lower priority. To expedite the resume process, the operating system is given control before all the pages of system memory have been restored.

The Fast Resume algorithm preferably saves a priority list based on previous usage, prior to entering the Hibernation state. The algorithm used for Fast Resume also tracks applications that have been used most recently, and applications that were open when the system went into Hibernation mode. The algorithm thus first restores the application or applications that were in use at the time that the system went into hibernation, and/or the applications that are most likely to be required after resuming operations.

The Fast Resume embodiment also preferably includes a method to intercept any read or write cycles to pages of system memory that have not yet been restored. Fast Resume assumes that not all pages of memory will be restored before system operation is turned over to the operating system. Applications that are subsequently called by the operating system or user may attempt to access physical pages of memory that have not been restored. To prevent a system error, the Fast Resume preferably includes a technique to restore memory pages before they are accessed by any other device or application.

According to an exemplary embodiment of the Fast Resume, the activity control monitor of FIG. 1 includes a present bit and an interrupt bit, both of which are readable and writeable by the algorithm 132. Any access to a memory page with the present bit cleared will generate an interrupt to the algorithm. According to the preferred embodiment, the interrupt comprises a Page Fault Exception Interrupt inside the CPU. The Page Directory and Page Table registers for each system memory segment include a present bit, as described more fully in commonly assigned and co-pending U.S. application Ser. No. 09/732,290, entitled "Redundant Suspend to RAM," filed the same day as the present application, the teachings of which are incorporated herein. If the present bit is set to a logical "0", and that range of memory is accessed, the Page Fault interrupt will be generated to the CPU, and the algorithm 132 will be called. The algorithm will recognize the interrupt before the access to that memory range occurs.

The activity monitors may be used to determine the usage of the corresponding memory page by monitoring both read and write activity to the page. This may be done by incrementing the priority data bits in the activity monitor registers in response to either a read or a write operation. In the preferred embodiment, the read and write activity is monitored using available bits in the page table registers in the CPU 130.

The Fast Resume sequence is setup during the Suspend to Disk operation. According to the preferred embodiment, a last used and/or most used quality is associated with each page while data is being saved to disk. The last used and/or most used indication then is used by the algorithm as a priority characteristic for restoring the memory pages. Thus, these or other characteristics are used to predict which memory pages will be used when the system is restored to normal operation.

If the latest usage prior to entering the suspend state is used as a basis for assigning priority, it is preferred that the activity monitors or the memory controller directly monitor the memory pages that are accessed. A priority register may be provided in the memory controller 100, control register 137, or CPU 130 that indicates the page or pages of memory that were last accessed. Thus, the memory controller may simply identify targeted pages, and list them (or targeted addresses) in a shift register. As each access occurs, its page or address is shifted into the shift register. Depending on the depth of the shift register, this is one technique to keep track of the latest targeted pages. To determine priority, the pages or addresses can then be read out in reverse order by causing the shift register to shift in the opposite direction.

If using the background save technique described in the Fast Hibernation embodiment, the algorithm can simply record which pages have not already been copied to the hard drive image when the Suspend to Disk event occurred. Thus, for example, if memory page B was the only page whose dirty bit was set in the corresponding activity monitor 126 when the Hibernation event occurred, then that page would receive first priority for restoration after resume. The algorithm may periodically poll the access bit and/or dirty bit for each page of memory to keep track of the pages most recently used. Successive polls by the algorithm would lower the priority for memory ranges which had no activity since the last poll, by testing the read or write bits to that memory page. Thus, priority can be established even without a background save.

If the algorithm uses greatest usage to assign priority, several techniques could be used. One technique would be to have the activity monitor include a counter that indexes each time a cycle targets the associated page. Other techniques could be based on the sleep mode usage of a memory page, or by measuring the temperature of the DRAM device.

Another technique for assigning priority would be based on critical usage. If a memory page is expected to be used by the BIOS, operating system, bus master devices, or interrupt special routines, then those pages of memory may receive higher priority. These software programs or devices may require short latency periods, and thus need quick access to data. Consequently, these memory sections that are intolerant of delay may receive priority during restoration.

According to the preferred embodiment, the algorithm records the priority based on last usage, most usage, critical usage, or a combination of these or other parameters. The priority preferably is recorded in the control register 137 at the time the Suspend to Disk is initiated. This priority then is used to sequence the restoration of data during Resume operations. The algorithm also sets a valid data bit associated with every page of system memory that was hibernated to the hard drive page mirror. Typically, restore from disk routines start at the lowest address range and systematically move upward. The Fast Resume conversely restores memory from the hard drive based on the priority established during Hibernation. Thus, if the priority established during the Hibernation sequence was page C, A, B, and D, then the algorithm will first read the priority saved in the control register 137, and will restore the hard drive page mirror for the memory address corresponding to Page C first.

The sequence for implementing the Fast Resume will now be described. During system initialization, the system POST will clear the present bits in the Page Directories and Page Tables, and in the activity monitors and control registers. When resuming from a hibernation event, the algorithm will read the control register and identify one or more priority pages of data. Data from the page or pages with the highest priority will then be copied from the hard drive page mirror to the system memory. As each page of memory is restored, the present bit in the activity monitor is set, and the dirty bit is cleared. The algorithm then may continue to restore all remaining pages to system memory during periods of CPU or hard drive inactivity, or the algorithm may delay restoration of the lower priority pages until an access is attempted to an address that has not yet been restored. If an access is made to an address in system memory that has not been restored, a Page Fault exception occurs because the present bit is cleared in the associated Page Directory and/or Page Table. The algorithm responds to the interrupt by checking the associated valid data bit that was stored in the control register 137. If the valid data bit was set for that page, then that range of system memory was last hibernated to disk during the last suspend. The algorithm then restores the hard drive image for that page. If the valid bit was not set in the control register for that page, then that range of system memory was not hibernated to the hard drive during the last suspend. The algorithm therefore passes control back to the operating system, which will then access the requested data in conventional fashion from the standard hard drive partition. Once the data is retrieved from the hard drive, the access that caused the Page Fault interrupt will be allowed to continue.

The algorithm for the Hibernation activity may be stored in BIOS, the operating system, an OS driver, or a combination of all three. The following algorithms are examples that accomplish the tasks of performing Fast Hibernation, performing a Hybrid Suspend, and a Fast Resume. The BIOS preferably is used to setup the hardware and initiate a driver-based algorithm to poll the activity monitors and perform background saves.

According to the preferred embodiment, the BIOS POST algorithm enables Fast Hibernation. The first step in enabling the Fast Hibernation is for the BIOS to execute a normal POST sequence, and to initialize memory. As part of the POST sequence, the BIOS determines the top of memory. At the end of the POST sequence during a cold boot of the computer system, the BIOS clears the control register bits to indicate that no memory has been written to disk. The BIOS then enables the priority enable feature to allow the memory controller to keep track and. prioritize the programmable memory regions. The BIOS then enables a periodic event, preferably based on CPU idle calls or hard disk inactivity timeouts, which will set a designated bit in CMOS memory to initiate the driver algorithm. The BIOS then waits for a suspend to disk event, and hands the system control to the operating system and driver algorithm.

The software driver algorithm saves memory to the hard disk in the background of normal operations. Thus, the driver operates while the operating system is loaded and the computer is in a normal working state. The driver first makes a call to the BIOS to see if the fast hibernation mode is supported on the system platform. If not supported, the driver does not load (or unloads, as the case may be). If supported, the driver algorithm polls a dedicated CMOS bit that indicates when to save memory regions to disk. If the designated CMOS bit is set, the driver calls the BIOS to obtain the status of each memory page or region. If the page priority is not the highest priority and the dirty bit is set in the activity monitor, the driver writes that region of system memory to the hard disk. Before writing the page to the hard drive, the driver algorithm will clear the dirty bit for that page in the associated activity monitor. After the write to hard disk is completed, the driver algorithm will set the data valid bit for that region in the control register. The driver continues this process with each memory page until all pages have been written except the highest priority memory page. This page is not written based on the assumption that this is the portion of memory that has the highest activity, and thus will be undergoing continuous change. This process may continue periodically until a suspend event is initiated.

The BIOS receives a suspend to disk event either through the operating system or through some external source., The BIOS first disables priority enable so that the priority can be subsequently saved. The BIOS then checks the valid data bit for a region and the dirty (or write) status bit. If the valid data bit is set and the dirty status bit is not set, then this region has already been written to disk. If the valid data bit is cleared, and the dirty status bit is cleared, then no valid data exists in this region. If the dirty status bit is set, then this region needs to be written to disk. The BIOS continues checking each of the page monitor registers until all regions with valid data that have not previously been saved are written to disk. The BIOS then saves the priority of all regions to CMOS so that they can be saved through the hibernation state. The BIOS then writes any other context information from video memory, the I/O controller, and other system resources to the hard disk to complete the save process.

The system stays in the hibernation mode until the BIOS receives a resume notification and proceeds through normal POST operations. At the end of POST, the BIOS will start to restore I/O context information, video memory and other system resources from the hard disk. Next the BIOS will restore the priority of each memory page, and restore at least one memory page with the highest priority from the hard disk. The BIOS then will set trap monitors in the control register to any region not restored from the hard drive. If a memory page is accessed that has not been restored, the memory controller holds off accesses to that page, and generates a Page Fault interrupt. The access is then deferred until that page of memory is restored. The BIOS receives the Page Fault interrupt, restores the memory page from the hard disk, and then clears the trap monitor for that page in the control register (by clearing the "Presence" bit). The memory controller then issues a deferred response to the host to supply the appropriate data As part of this process, the driver algorithm polls CMOS for inactivity, and looks for regions where the Page Fault interrupt has been enabled (indicated by the Presence bit in the control register). The driver will then disable Page Fault interrupt generation on a specific memory page, and then restore the data from disk for that page of memory. On completion of the restore operation to that page, the driver clears the presence bit to that region of memory.

The present invention and embodiments disclosed herein are subject to many modifications and variations. The hardware activity monitors may be located in the memory modules, the memory controller, in the CPU, or elsewhere in the system. Furthermore, the control register and activity monitors may be merged into a single set of registers. In addition, the status of the bits in the activity monitors may be read via the $I_2C$ bus, or any other suitable bus. The activity monitors may not correspond to a fixed memory address range, but instead may be dynamically and variably sized by the algorithm. For example, an adjacent memory monitor ranges with little or no activity could be combined and monitored by a single monitor with a large address range. Memory pages with higher activity could be assigned to multiple monitors, each with smaller address ranges, increasing the chances that a background save will be written through to the hard disk before the suspend event. Any processor memory cache may be written directly to the hard drive, and not written through to main memory. In addition, instead of selectively powering off memory, some of the memory may simply remove the refresh clock to save power.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method of placing a computer system into a hibernation state, comprising the acts of:

calculating a priority value for each page of system memory;

storing the priority value in a designated register;

storing each page of system memory that includes valid data to non-volatile memory;

entering a hibernation state;

resuming from a hibernation state;

reading the priority value from the designated register; and restoring the page of system memory with the highest priority before restoring any other page of system memory.

2. The method of claim 1, wherein the priority value is assigned based on a last used criteria.

3. The method of claim 1, wherein the priority value is assigned based on a most used criteria.

4. The method of claim 1, wherein the priority value is assigned based on a most critical criteria.

5. The method of claim 1, further comprising the act of passing operation to an operating system prior to restoring pages of memory other than the page with the highest priority value.

6. The method of claim 1, further comprising the act of passing operation to an operating system prior to restoring pages of memory other than the pages with the highest priority values.

7. A computer system capable of entering a hibernation mode of operation, comprising:

a CPU;

a system memory that is divided into a plurality of pages;

a nonvolatile memory device;

a register that includes one or more bits that indicate a priority value assigned to each page of memory;

wherein the CPU stores each page of memory that includes valid data in non-volatile memory when a hibernation mode is initiated, together with the register; and wherein the CPU restores the page of memory with the highest priority value prior to restoring any other page of memory.

8. A system as in claim 7, wherein the CPU passes control to an operating system after restoring the page of memory with the highest priority.

9. A system as in claim 7, wherein the CPU passes control to an operating system after restoring the pages of memory with the highest priorities.

* * * * *